June 7, 1938. W. O. BECHMAN 2,119,770
FINAL DRIVE MECHANISM FOR CRAWLER TRACTORS
Filed Sept. 21, 1936
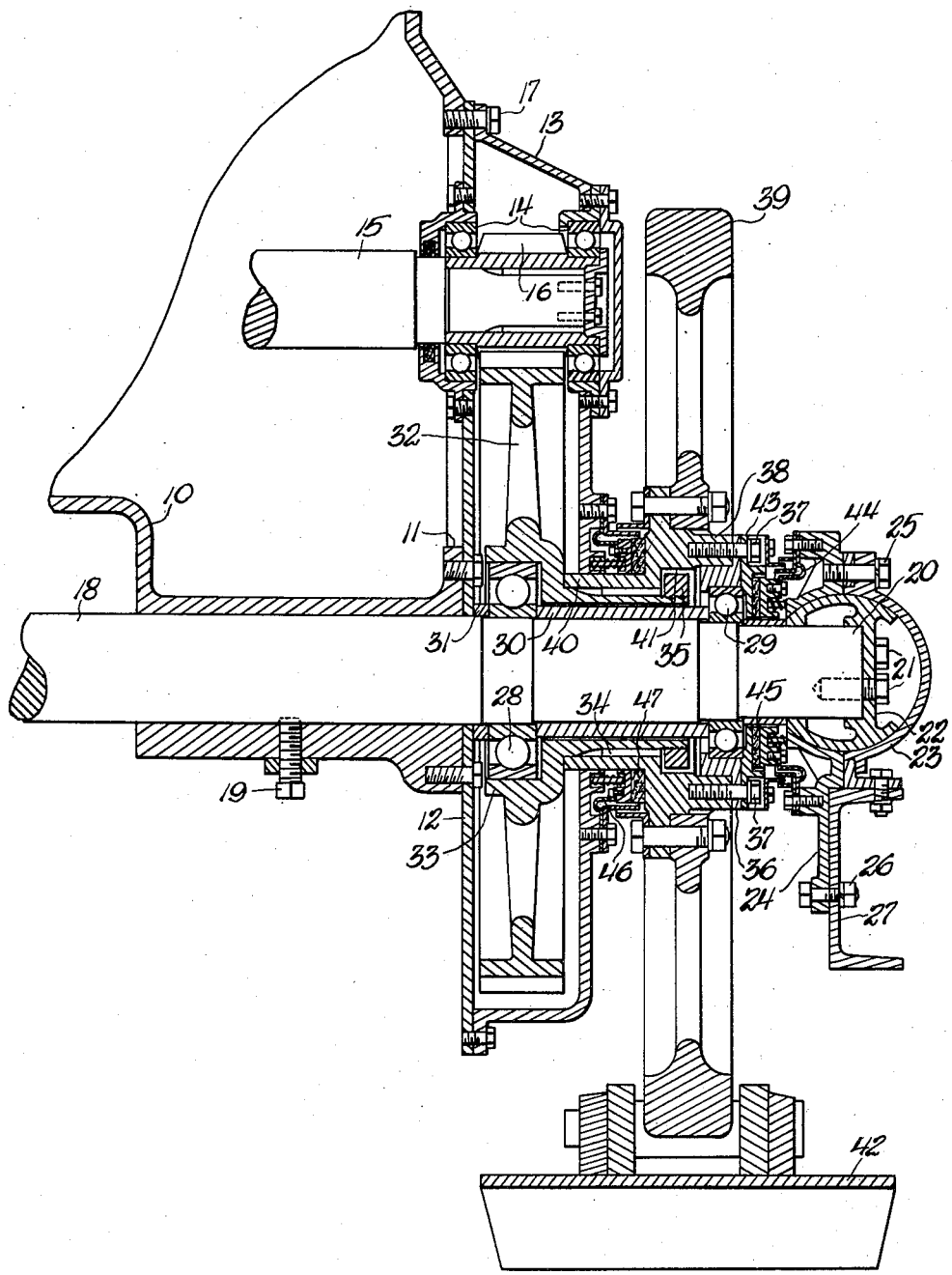
Inventor
William O. Bechman Patented June 7, 1938

2,119,770

UNITED STATES PATENT OFFICE 2,119,770

FINAL DRIVE MECHANISM FOR CRAWLER TRACTORS

William O. Bechman, Chicago, Ill., assignor to International Harvester Company, a corporation of New Jersey Application September 21, 1936, Serial No. 101,708

6 Claims. (Cl. 180—9.1)

The invention relates to a final drive mechanism for crawler tractors of the type in which the body of the tractor adjacent its rear end carries a transverse horizontal shaft structure providing an axis, about which the rear end of the usual side track frames is pivoted for up and down movement. By providing a drive structure concentric about the axis of this shaft structure, the problem of shielding the track structure and driving mechanism to exclude dirt and stones is materially simplified.

The main object of the invention is to provide a track driving mechanism embodying a drive gear and a drive sprocket wheel disposed concentrically about the shaft to which the side track frame is pivoted with the gear enclosed entirely in a housing and having a hub projecting outwardly through the outer side of the housing, so that the hub of a drive sprocket wheel for the track disposed outside said housing may be drivingly coupled with the enclosed gear.

Another object of the invention is to provide an improved assembly of the drive parts mentioned to facilitate repairs and inspection.

Another object of the invention is to provide in the particular arrangement specified an improved arrangement of seals between the sprocket wheel and housing and between the sprocket wheel and the pivot block by which the side track frame is pivoted to the outer end of the shaft structure.

Other objects will become apparent to those skilled in this art as the disclosure is more fully made.

The drawing illustrates a practicable form of the novel structure of this invention and the single figure of the drawing depicts a vertical sectional view through one side of the tractor to illustrate in detail the final drive mechanism.

Since both sides of the tractor are identical, only the right hand side thereof will be shown and described.

A tractor body appears at 10, the same having at one side a large side opening 11, over which is mounted a closure plate 12. The plate 12 has associated therewith a cover housing 13, the housing 13 and plate 12 carrying near its upper edge a pair of spaced bearings 14 serving as a journal for a transverse countershaft 15, the end of which inside said housing 13 carries keyed thereon a spur gear 16. Bolts 17 are used to connect or fasten the housing 13 and plate 12 to the body 10, as shown.

The rear end of the body 10, at a point below the transverse shaft 15 rigidly carries a heavy transverse horizontal shaft 18, which is held against turning movement in the body 10 by means of a set screw 19, said shaft 18 at the end thereof shown projecting through an opening in the plate 12 and through an opening in the outer face of the cover housing 13. The protruded end of the shaft 18 is reduced, as at 20, and has securely fastened thereto by screws 21 a ball member 22, about which is rockably mounted a socketed, rockably mounted, spherical member 23, which includes a hanger plate 24 connected by bolts 25 thereto, said plate 24, by means of bolts 26, having rigidly secured thereto the tractor side frame 27 in such a manner that the rear end of the frame 27 is connected to the dead axle 18 for pivotal movement. This side track frame 27, it can now be seen, not only has up and down movement as is usual in the track type tractor art, but, by virtue of the ball joint provided, may also have slight lateral movement. In fact, the ball joint is such that almost any twisting strain from any direction resulting from the movement of the track frame 27 can be accommodated by the universal ball joint, so as not to cause damage or misalignment of the dead axle 18.

Inside the housing 13 and independently of the body 10 the shaft 18 carries an antifriction bearing 28 of the ball type, and at another point exteriorly of said housing 13 the shaft 18, just inside of its reduced end portion 20, carries a similar but somewhat smaller bearing 29. These two bearings 28 and 29 are held in spaced apart relation by a spacer sleeve 30, the bearing 28 further being held in position away from the plate 12 by means of a spacer ring 31.

Journaled on the bearing 28 is a large drive spur gear 32 having a hollow hub 33 embracing the bearing 28. The opposite face of the spur gear 32 is extended outwardly and laterally as a sleeve 34 through an opening provided in the outer wall of the housing 13. That portion of the sleeve 34 disposed outside the housing 13 is formed with an exterior spline conformation and a short projecting end of the sleeve 34 outwardly of the spline is threaded to carry a nut 35.

Disposed on the bearing 29 is a flange collar 36 to which is connected, by a circle of bolts 37, the hub 38 of a track chain drive sprocket wheel 39. The hub 38 includes a sleeve or collar 40, which telescopically fits over the sleeve 34 of the gear 32, said sleeve or collar 40 having an internally splined conformation, so that the hub 38 may be slid axially onto the sleeve 34 and thereby establish a driving relationship, causing the spur gear 32 and drive sprocket 39 to turn as a unit, it being clear that the gear 32 is driven from the gear 16 and the countershaft 15. The hub 38 of the sprocket wheel 39 is hollowed out, as at 41, to accommodate the nut 35 heretofore mentioned. An endless track chain driven by the drive sprocket 39 is shown at 42.

The bolts 37 also serve to fasten a plate 43 against the outer face of the bearing 29 to hold the latter in place and between said plate 43, which rotates with the sprocket wheel 39, and the hanger plate 24, which moves with the track frame 27, there is provided a labyrinth type of seal 44 including a sealing element 45, which is constantly pressed yieldably against the outer face of the plate 43 in a manner well known in this art. This seal structure 44 and 45 serves to exclude the entry of dirt to the bearing 29 and prevents the leakage of oil from the bearing outwardly past said seal structure. Thus, a compact seal structure is provided between the sprocket 39 and the pivot block connection 24, that serves to hang the track frame 27.

A similar type of labyrinth seal is provided between the outer wall of the housing 13 and the proximate face of the hub 38 for the drive sprocket wheel 39, said seal comprising a labyrinth seal member 46 and a seal element 47, which is yieldably pressed away from the outer wall of the housing 13 and into sealing engagement with the adjacent face of the hub 38 for the sprocket wheel 39. Thus, it can be seen that a compact, efficient seal surrounds the sleeve 40 of the hub 38 for the sprocket 39 and is compactly located between the outer wall of the housing 13 and the adjacent face of the sprocket wheel hub 38. Thus, dirt cannot get into the housing 13 and the bearing 28, nor can oil from within the housing 13 leak outwardly past said seal 46 and 47.

The entire structure lends itself very nicely to assembly and disassembly with the respective parts all being placeable in order axially by sliding the same onto the shaft 18.

It can now be seen that the two bearings 28 and 29 are entirely carried by the shaft 18 and are properly spaced for carrying the driving unit 32—39 for the track 42, the shaft 18 being heavy enough to serve as a support for maintaining the unit 32—39 coaxially with the axis of the shaft 18 and said shaft 18 further serving as a pivot mount for the track frame 27.

It is the intention to cover all such changes and modifications of the example of the invention herein disclosed which do not in material respects constitute departures from the spirit and scope of the invention as herein claimed.

What is claimed is:

1. In a tractor having a body, a transverse dead axle carried thereby, a housing at the side of the body through which the axle extends to expose said end at the side of the housing, the combination with said axle of a final drive mechanism for a crawler track comprising a bearing carried on the axle inside the housing, a second bearing spaced therefrom and carried on the axle outside the housing adjacent the end of the axle, a gear journaled on the first bearing inside the housing and having a sleeve around the axle extending laterally outwardly through an opening in said housing, a drive sprocket wheel journaled on the second bearing exteriorly of the housing and having a sleeve telescoping the sleeve on the gear, the sprocket wheel sleeve being connected to the gear sleeve whereby the gear and sprocket wheel turn together, a spherical pivot block secured to the end of the axle, a track frame, a socket member for rockably connecting said frame to said block and to the end of the axle adjacent the outer face of the sprocket wheel, and a seal structure surrounding the axle and disposed between the socket member and outer face of the sprocket wheel.

2. In a tractor having a body, a transverse axle carried thereby, a housing at the side of the body through which the axle extends to expose said end at the side of the housing, the combination with said axle of a final drive mechanism for a crawler track comprising a bearing carried on the axle inside the housing, a second bearing carried on the axle outside the housing adjacent the end of the axle, a gear journaled on the first bearing inside the housing including a sleeve extending laterally outwardly through an opening in said housing, the outer end of the sleeve being threaded, a nut on said threaded end, a drive sprocket wheel journaled on the second bearing exteriorly of the housing and including a sleeve hub extending inwardly to telescope the sleeve on the gear, means detachably connecting the telescoped sleeves whereby the gear and sprocket wheel turn together, said sprocket including a hollow hub providing a space for said nut, and a plate including a carrier for the second bearing and fastened to the sprocket wheel.

3. In a tractor having a body, a transverse dead axle carried thereby, a housing at the side of the body through which the axle extends to expose said end at the side of the housing, the combination with the axle of a final drive mechanism for driving a crawler track comprising a bearing carried on the axle inside the housing, a gear journaled on the bearing within the housing and including an externally splined sleeve extending outwardly through an opening in the housing, a spacer disposed on the axle coaxially thereof between the axle and the sleeve and extending outwardly beyond the outer end of said sleeve, a drive sprocket wheel including an inwardly extending internally splined sleeve telescoped over the gear sleeve for rotation therewith, said sprocket wheel at its outer face being provided with an annular recess, and a second bearing journaled on the axle adjacent its outer end and abutting the outer end of the spacer, said bearing being fitted into the annular recess in the sprocket to form a bearing support therefor.

4. In a tractor having a body, a transverse dead axle carried thereby, a housing at the side of the body through which the axle extends to expose said end at the side of the housing, the combination with the axle of a final drive mechanism for driving a crawler track comprising a bearing carried on the axle inside the housing, a gear journaled on the bearing within the housing and including an externally splined sleeve extending outwardly through an opening in the housing, a spacer disposed on the axle coaxially thereof between the axle and the sleeve and extending outwardly beyond the outer end of said sleeve, a drive sprocket wheel including an inwardly extending internally splined sleeve telescoped over the gear sleeve for rotation therewith, said sprocket wheel at its outer face being provided with an annular recess, a second bearing journaled on the axle adjacent its outer end and abutting the outer end of the spacer, said bearing being fitted into the annular recess in the sprocket to form a bearing support therefor, and a track frame pivotally connected to the end of the axle adjacent the outer face of the sprocket wheel.

5. In a tractor having a body, a transverse dead axle carried thereby, a housing at the side of the body through which the axle extends to expose said end at the side of the housing, the combination with the axle of a final drive mechanism for driving a crawler track comprising a bearing carried on the axle inside the housing, a gear journaled on the bearing within the housing and including an externally splined sleeve extending outwardly through an opening in the housing, a spacer disposed on the axle coaxially thereof between the axle and the sleeve and extending outwardly beyond the outer end of said sleeve, a drive sprocket wheel including an inwardly extending internally splined sleeve telescoped over the gear sleeve for rotation therewith, said sprocket wheel at its outer face being provided with an annular recess, a second bearing journaled on the axle adjacent its outer end and abutting the outer end of the spacer, said bearing being fitted into the annular recess in the sprocket to form a bearing support therefor, said sprocket wheel being further provided with a second annular recess axially inwardly of the first annular recess, and means removably secured to the gear sleeve and engaging the sprocket wheel sleeve within said second recess for preventing relative axial movement between said sleeves.

6. In a tractor having a body, a transverse dead axle carried thereby, a housing at the side of the body through which the axle extends to expose said end at the side of the housing, the combination with said axle of a final drive mechanism for a crawler track comprising a bearing carried on the axle inside the housing, a second bearing spaced therefrom and carried on the axle outside the housing adjacent the end of the axle, a gear journaled on the first bearing inside the housing and having a sleeve around the axle extending laterally outwardly through an opening in said housing, a drive sprocket wheel journaled on the second bearing exteriorly of the housing and having a sleeve telescoping the sleeve on the gear, the sprocket wheel sleeve being connected to the gear sleeve whereby the gear and sprocket wheel turn together, a spherical pivot block secured to the end of the axle, a track frame, and a socket member for rockably connecting said frame to said block and to the end of the axle adjacent the outer face of the sprocket wheel.

WILLIAM O. BECHMAN.